United States Patent
Khan et al.

(10) Patent No.: US 10,557,915 B2
(45) Date of Patent: Feb. 11, 2020

(54) PROVIDING AN INDICATION OF A HEADING OF A MOBILE DEVICE

(71) Applicant: HERE GLOBAL B.V., Eindhoven (NL)

(72) Inventors: Muhammad Irshan Khan, Tampere (FI); Jari Syrjärinne, Tampere (FI); Pavel Ivanov, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/551,176

(22) PCT Filed: Feb. 16, 2015

(86) PCT No.: PCT/EP2015/053175
§ 371 (c)(1),
(2) Date: Aug. 15, 2017

(87) PCT Pub. No.: WO2016/131467
PCT Pub. Date: Aug. 25, 2016

(65) Prior Publication Data
US 2018/0038936 A1     Feb. 8, 2018

(51) Int. Cl.
*H04W 24/00*     (2009.01)
*G01S 5/02*       (2010.01)
*G01S 11/02*      (2010.01)

(52) U.S. Cl.
CPC ........... *G01S 5/0247* (2013.01); *G01S 5/0236* (2013.01); *G01S 11/02* (2013.01)

(58) Field of Classification Search
CPC ....... G01S 5/0247; G01S 5/0236; G01S 11/02
(Continued)

(56) References Cited

U.S. PATENT DOCUMENTS 5,525,998 A    6/1996  Geier
2011/0202225 A1  8/2011  Willis et al.
(Continued)

FOREIGN PATENT DOCUMENTS

CN      104322119 A     1/2015
WO   WO 2014/113874 A1   7/2014

OTHER PUBLICATIONS

International Search Report and Written Opinion from International Application No. PCT/EP2015/053175, dated Dec. 4, 2015, 12 pages.
(Continued)

*Primary Examiner* — Huy C Ho
(74) *Attorney, Agent, or Firm* — Alston & Bird LLP

(57) ABSTRACT

An apparatus estimates successive headings of a mobile device based on respective results of measurements by the mobile device on radio signal transmitted by a plurality of transmitters to obtain estimated headings (201). It computes a mean heading based on a predetermined number of the estimated headings and computing a standard deviation of the predetermined number of estimated headings (202). It determines whether the mean heading is to be considered valid based on the computed standard deviation of the estimated headings (203). Finally, it provides an indication of the mean heading as an indication of a current heading of the mobile device for use by a specific application only if the mean heading is determined to be considered valid (204).

20 Claims, 9 Drawing Sheets

(58) Field of Classification Search
USPC .................................................. 455/456.1
See application file for complete search history.

(56) References Cited

U.S. PATENT DOCUMENTS

| | | |
|---|---|---|
| 2011/0246148 A1 | 10/2011 | Gupta et al. |
| 2011/0250931 A1* | 10/2011 | Pande .................. G01C 21/165 455/566 |
| 2012/0136573 A1 | 5/2012 | Janardhanan et al. |
| 2012/0245839 A1 | 9/2012 | Syed et al. |
| 2013/0053064 A1* | 2/2013 | Park .................... H04W 64/006 455/456.1 |
| 2013/0310064 A1 | 11/2013 | Brachet et al. |
| 2013/0331121 A1 | 12/2013 | Bandyopadhyay et al. |
| 2015/0312876 A1 | 10/2015 | Syrjarinne et al. |
| 2016/0161592 A1 | 6/2016 | Wirola et al. |

OTHER PUBLICATIONS

International Preliminary Report on Patentability (chapter 1) for International Patent Application No. PCT/EP2015/053175 dated Aug. 22, 2017, 2 pages.

Office Action for European Application No. 15 706 726.5 dated Oct. 4, 2018, 5 pages.

Faragher, R. M. et al., SmartSLAM—*An Efficient Smartphone Indoor Positioning System Exploiting Machine Learning and Opportunistic Sensing*, Proceedings of the 26h International Technical Meeting of the Satellite Division of the Institute of Navigation (Sep. 2013) 14 pages.

Kalman filter—Wikipedia [online] [retrieved Jul. 19, 2019]. Retrieved from the Internet: <https://web.archive.org/web/20170803185405/https://en.wikipedia.org/wiki/Kalman_filter#Hybrid_Kalman_filter>, (Jul. 18, 2017) 17 pages.

Office Action for Chinese Application No. 201580076273.7 dated Oct. 31, 2019, 19 pages.

\* cited by examiner

PROVIDING AN INDICATION OF A HEADING OF A MOBILE DEVICE

FIELD OF THE DISCLOSURE

The invention relates to the field of positioning and more specifically to providing an indication of a heading of a mobile device.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BTLE) based positioning solutions, and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner. Collected fingerprint data may be uploaded to a database in a server or in the cloud, where algorithms may be run to generate models of WLAN access points for positioning purposes.

In the positioning stage, a mobile device may estimate its current location based on own measurements taken from the radio interface and on the data or a subset of data that is available from the training stage. Models or parts of models that have been generated in the training stage may be transferred to mobile devices for use in position determination. Alternatively, the models may be stored in a positioning server to which the mobile devices may connect to for obtaining position information. In addition to the current location of the mobile device, the available data may be used in the positioning stage for estimating other position related information, like velocity and heading of the mobile device.

A similar approach could be used for a positioning that is based on other types of terrestrial communication nodes or on a combination of different types of terrestrial communication nodes.

SUMMARY OF SOME EMBODIMENTS OF THE INVENTION

An example embodiment of a method according to the invention comprises, performed by at least one apparatus, estimating successive headings of a mobile device based on respective results of measurements by the mobile device on radio signal transmitted by a plurality of transmitters to obtain estimated headings. The method further comprises computing a mean heading based on a predetermined number of the estimated headings and computing a standard deviation of the predetermined number of estimated headings. The method further comprises determining whether the mean heading is to be considered valid based on the computed standard deviation of the estimated headings. The method further comprises providing an indication of the mean heading as an indication of a current heading of the mobile device for use by a specific application only, if the mean heading is determined to be considered valid.

An example embodiment of a first apparatus according to the invention comprises means for performing the actions of any embodiment of the presented example method.

The means of the first apparatus may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit.

An example embodiment of a second apparatus according to the invention comprises at least one processor and at least one memory including computer program code, the at least one memory and the computer program code configured to, with the at least one processor, cause the apparatus at least to perform the actions of any embodiment of the presented example method.

Any of the described apparatuses may comprise only the indicated components or one or more additional components.

Moreover an example embodiment of a system is presented, which comprises any embodiment of any presented example apparatus. The apparatus is one of the mobile device and a server. The system further comprises a server, in case the apparatus is the mobile device; and the system further comprises the mobile device, in case the apparatus is a server. Optionally, the system may further comprise various other components.

Moreover an example embodiment of a non-transitory computer readable storage medium is presented, in which computer program code is stored. The computer program code causes an apparatus to perform the actions of any embodiment of the presented example method when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for providing an indication of a heading of a mobile device. In certain embodiment, any of the presented first apparatuses is an apparatus for an indication of a heading of a mobile device.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
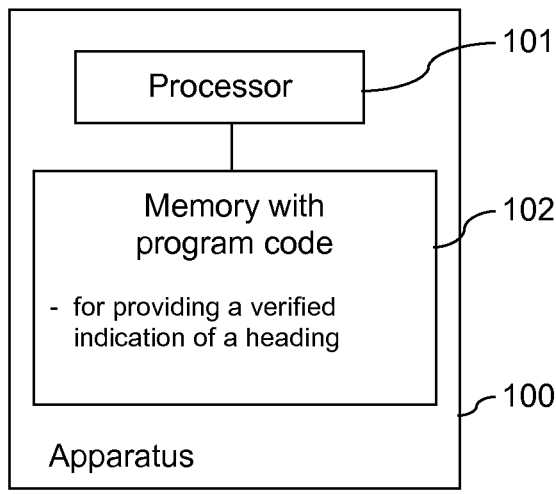
FIG. 1 is a schematic block diagram of an example embodiment of an apparatus.

FIG. 1 is a schematic block diagram of an example embodiment of an apparatus 100 according to the invention. Apparatus 100 comprises a processor 101 and, linked to processor 101, a memory 102. Memory 102 stores computer program code for providing indications of validated headings of a mobile device. Processor 101 is configured to execute computer program code stored in memory 102 in order to cause an apparatus to perform desired actions.

Apparatus 100 could be a stationary device, like a positioning server or some other server, or a mobile device, like a mobile communication device. A stationary device is configured to be stationary when in operation. A mobile device is configured to enable operation while the device is moving. Apparatus 100 could equally be a module, like a chip, circuitry on a chip or a plug-in board, for a device. Optionally, apparatus 100 could comprise various other components, like a data interface, a user interface, a further memory, a further processor, etc. If the apparatus is a server, it could be a server that is configured to obtain results of measurements from mobile devices.

An operation of apparatus 100 will now be described with reference to the flow chart of FIG. 2. The operation is an example embodiment of a method according to the invention. Processor 101 and the program code stored in memory 102 cause an apparatus to perform the operation when the program code is retrieved from memory 102 and executed by processor 101. The apparatus that is caused to perform the operation may be apparatus 100 or some other apparatus, for example but not necessarily a device comprising apparatus 100.

The apparatus estimates successive headings of a mobile device based on respective results of measurements by the mobile device on radio signal transmitted by a plurality of transmitters to obtain estimated headings. (action 201) A heading is to be understood to represent a direction of movement of the mobile device.

The apparatus furthermore computes a mean heading based on a predetermined number of the estimated headings and computes a standard deviation of the predetermined number of estimated headings. (action 202) The predetermined number of the estimated headings may comprise for example, though not necessarily, subsequent headings of the estimated headings. The mean heading may be computed in any suitable manner, for example, though not exclusively, as a sample mean. The standard deviation may be computed in any suitable manner, for example, though not exclusively, as a sample standard deviation.

The apparatus furthermore determines whether the mean heading is to be considered valid based on the computed standard deviation of the estimated headings. (action 203)

The apparatus furthermore provides an indication of the mean heading as an indication of a current heading of the mobile device for use by a specific application only, if the mean heading is determined to be considered valid. (action 204) It is to be understood that the decision on providing an indication of the mean heading as an indication of a current heading for use by the specific application may also be taken by the specific application itself.

The invention proceeds from the consideration that information on a respective heading of a mobile device may be of value for various applications. When heading information is used for instance by navigation applications, it may be important that an assumed heading is sufficiently accurate. Accurate heading information may also be used with sensors in order to obtain more accurate results. For instance, a heading of a device may be estimated based on a radio signal based positioning, and the motion of a user may be detected using inertial sensors, like accelerometers. Steps of the user may then be determined based on acceleration values of the device and on matching the pattern of acceleration with a human motion pattern. In some cases, it may be difficult to determine whether an assumed heading is accurate.

Certain embodiments of the invention therefore provide that a number of headings estimated for a mobile device are evaluated by means of statistical tools to determine the validity of the headings. The mean of a brief history of headings may be useful in estimating an accurate current heading of a mobile device, while the standard deviation of this brief history of headings may provide an indicator of validity of this current heading. The standard deviation may thus be a suitable criterion for filtering out unreliable headings to the effect that only determined current headings that are considered to be valid are provided for use by particular applications.

Certain embodiments of the invention may have the effect that they allow determining the validity of heading information in a fairly simple and efficient manner. Certain embodiments of the invention may have the effect that they ensure that certain applications that rely on accurate heading information are only provided with heading information that can be assumed to be sufficiently accurate. Certain embodiments of the invention may have the effect that they allow improving the overall performance of and/or user experience with such applications.

Figure 2:
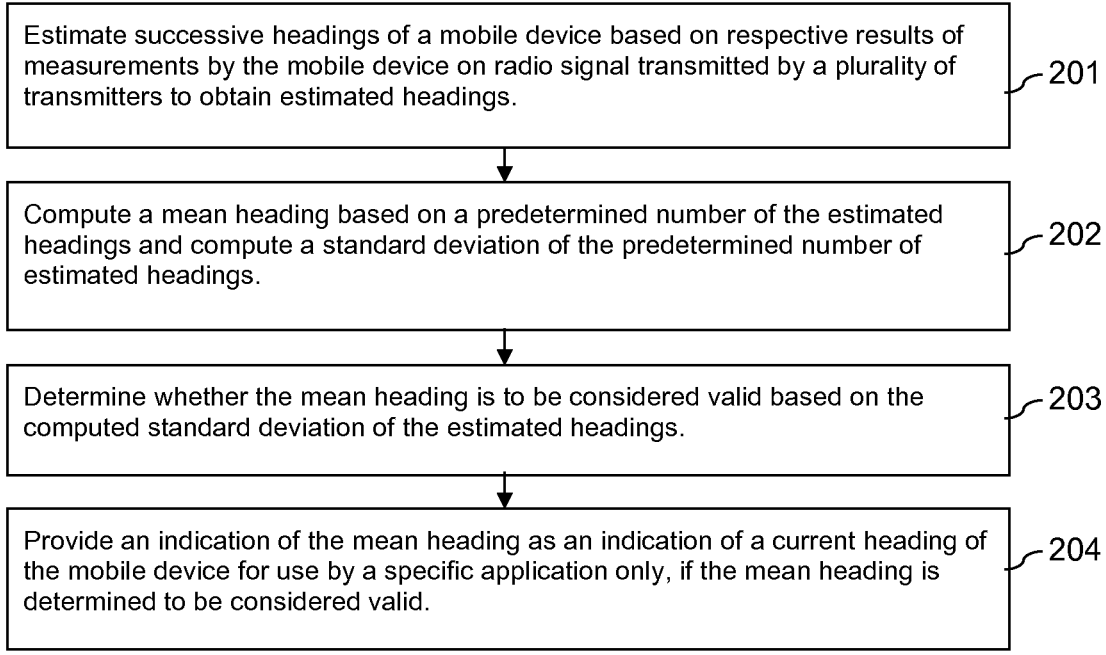
FIG. 2 is a flow chart illustrating an example embodiment of a method.

Apparatus 100 illustrated in FIG. 1 and the method illustrated in FIG. 2 may be implemented and refined in various ways.

A heading may be estimated, for instance, as an angle relative to a reference direction, like an x-axis of any Cartesian coordinate system or East-axis in positive direction of an East-North coordinate system. The reference direction could be defined on a general basis or separately for each geographical site in which a heading of a mobile device may have to be determined. It is to be understood that other forms could be used as well, like an indication of a slope along with an indication of orientation.

In an example embodiment, determining whether the mean heading is to be considered valid comprises comparing the computed standard deviation with a predetermined threshold. The threshold may be set to any suitable value, depending for instance on the desired degree of accuracy. It could be set for instance to any value between 10° and 45°, for example 30°, if the heading is determined in the form of an angle relative to a reference direction. The mean heading may then be determined to be considered to be valid if the standard deviation falls short of the predetermined threshold. As a minor variation, it may be determined to be considered to be valid if the standard deviation is smaller or equal to the predetermined threshold. Otherwise it may be determined that the mean heading is to be considered not to be valid. If the standard deviation is small, this may indicate that similar headings have been determined recently, which may provide a hint that the mean of these headings can be considered to be reliable.

In an example embodiment, estimating a heading comprises estimating positions of the mobile device based on the results of the measurements on radio signals at the mobile device. It may further comprise estimating a velocity of the mobile device based on the estimated positions to obtain an estimated velocity having at least two components for at least two different directions. It may further comprise estimating a heading of the mobile device based on the at least two components of the estimated velocity. It is to be understood that the estimated headings may be estimated in any suitable different manner too. A heading could also be estimated, for example, directly from the coordinates of two positions that have been determined most recently. The at least two components of the estimated velocity may not only be used as a basis for estimating the heading but optionally also for estimating the speed of the mobile device.

The position of the mobile device may be estimated based on all measurement results that are available for a particular measurement location or on selected measurement results. For example, some measurement results may be excluded from the estimation based on certain criteria. By way of example, if the measurement results include an indication of a received signal strength, a position may be estimated based on measurement results only, which include an indication of a received signal strength exceeding a predetermined threshold.

In an example embodiment, the estimated positions are estimated using in addition stored assistance data. Such assistance data may comprise any data that allows estimating the position of a mobile device based on the results of measurements on radio signals at the mobile device.

The assistance data could comprise for example stored data defining radio models for at least some of the plurality of transmitters. Such a radio model may be any kind of model that is defined by values of a limited set of parameters and that enables an estimation of a position of a mobile device. It could be for instance a path loss model. However, it could also be another kind of model, like a timing advance model, that is, a model that describes the length of a time that it takes a signal to reach the mobile device from the transmitter (or vice versa). Parameter based radio model data may have the effect that it requires relatively little storage space and relatively little bandwidth for transmission.

Alternatively, the assistance data could comprise for example stored radio map data in the form of grid data. A grid may represent a geographical site, wherein grid points of the grid represent geographical locations. To at least some of the grid points, data may be associated which identifies transmitters that can be expected to be observed at the geographical location represented by the grid point and which indicates a signal strength of radio signals of the identified transmitters that can be expected to be measured at the geographical location represented by the grid point. If the geographical site corresponds to a building, separate grids could be provided for each floor of the building. Using grid data may have the effect that it is easy to match results of measurements of a mobile device to corresponding data that is associated with a particular grid point of the grid. It is to be understood that instead of signal strength related values, other types of data could be associated with the grid points.

In an example embodiment, the estimated position is a two dimensional position in any kind of coordinate system. It could comprise for instance an East component—or coordinate—and a North component—or coordinate—for a local East-North coordinate system. Alternatively, it could comprise a Longitude value and a Latitude value of a geographic coordinate system.

In an example embodiment, the estimated velocity is a velocity in a horizontal plane. It could comprise for instance an East component and a North component an East-North coordinate system. The velocity may be computed for example using the inverse of the tangent formula.

In an example embodiment, computing the mean heading and the standard deviation comprises removing effects of a discontinuity occurring at boundaries of a used range of headings in degrees. For instance, if a heading is indicated in degrees in a range from 0° to 360°, there is a discontinuity at 0°/360°, which may result in errors when computing a mean heading and a standard deviation of headings. Similarly, if a heading is indicated in degrees in a range from −180° to 180°, there is a discontinuity at −180°/180°, which may result in errors when computing a mean heading and a standard deviation of headings.

In an example embodiment, the results of measurements at the mobile device include for each of the plurality of transmitters at least a signal strength related value and an identification of the transmitter. This may have the effect that signals from a large variety of transmitters can be considered.

In an example embodiment, the plurality of transmitters comprises at least one terrestrial transmitter, since satellite signals may be less suited for indoor positioning. It is to be understood, however, that measurement results on satellite signals could be used as well in some embodiments. In an example embodiment, the plurality of transmitters comprises at least one non-cellular terrestrial transmitter. The at least one non-cellular terrestrial transmitter could comprise any non-cellular ground based transmitter that is configured to transmit radio signals. In an example embodiment, it comprises at least one wireless local area network access point and/or at least one Bluetooth transmitter and/or at least one BTLE transmitter. It is to be understood that a Bluetooth transmitter and a BTLE transmitter could optionally be a part of a respective transceiver. WLAN and Bluetooth transmitter are already installed in many buildings. Furthermore, WLAN and Bluetooth technologies are already supported in many mobile user devices, like smartphones, tablets, laptops and in the majority of feature phones. Using WLAN access points, Bluetooth transmitters and/or BTLE transmitters as communication nodes may thus have the effect that the supported positioning can be based on an existing infrastructure in buildings and on existing capabilities in mobile devices. As a result, the approach may be globally scalable and have low maintenance and deployment costs. The deployment of new infrastructure, including for example beacons and tags, is not necessary. In addition, the end-user experience may be acceptable with these technologies, since a horizontal positioning accuracy of 2-3 meters as well as close to 100% reliability in floor detection may be achieved. It is to be understood that the at least one transmitter could also comprise at least one cellular transmitter, like a base station of a cellular communication network. However, due to the narrow frequency bands of cellular signals, WLAN and Bluetooth nodes may generally enable a more accurate positioning. Furthermore, transmitters transmitting any other kind of wireless signals, including for instance ultra-wideband (UWB) signals or any wireless signals that might emerge in the future, may be used as well. The transmitters do not even have to be ground-based necessarily. For example, the transmitters could also comprise transmitters in a ship.

In an example embodiment, the specific application may be any kind of application that considers a heading of a mobile device, and in particular any application that is able to provide a better performance when enabled to consider only accurate headings of a mobile device. The specific application may be or example a navigation application, and/or a position tracking application, and/or an application matching positions and headings of the mobile device to a map, and/or an application presenting position and heading of the mobile device to user on a display, and/or an application fusing measurements of at least two motion sensors. The specific application may be implemented within the mobile device or external to the mobile device.

In an example embodiment, the apparatus that verifies and provides heading information is or belongs to the mobile device which measures the radio signals. This may have the effect that the mobile device may improve the quality of the operation of an application independently of a server. In an alternative example embodiment, the apparatus that verifies and provides heading information is or belongs to a server that is configured to obtain results of measurements on radio signals from mobile devices, for instance in the scope of a positioning/tracking request from the devices. This may have the effect that processing resources of the mobile device can be saved.

Figure 3:
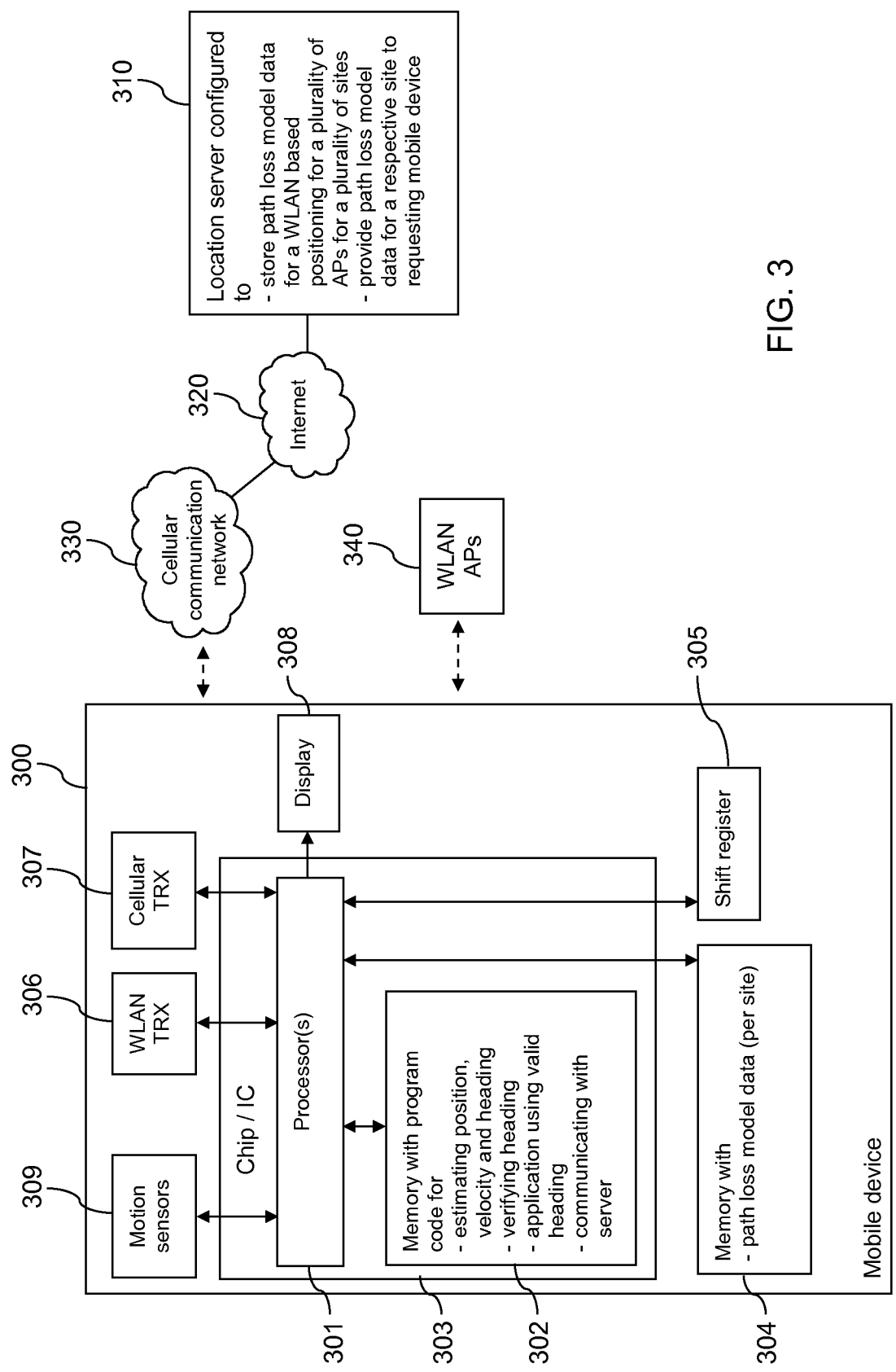
FIG. 3 is a schematic block diagram of a first example embodiment of a system.

FIG. 3 is a schematic block diagram of a first example embodiment of a system according to the invention, in which a mobile device is configured to verify and provide heading information.

The system comprises a mobile device 300 and a location server 310. The system further comprises a network 320, by way of example the Internet. The system further comprises a cellular communication network 330 that is connected to the Internet 320. The system further comprises a number of WLAN access points (AP) 340.

Mobile device 300 may be for instance a mobile terminal, like a smartphone or a tablet PC. Mobile device 300 comprises a processor 301 that is linked to a first memory 302, to a second memory 304, to a shift register 305, to a WLAN component 306, to a cellular communication component 307, to a display 308 and other user input and output means, and to motion sensors 309.

Processor 301 is configured to execute computer program code, including computer program code stored in memory 302, in order to cause mobile device 300 to perform desired actions.

Memory 302 stores computer program code for estimating position, velocity and heading of mobile device 300 using stored path loss model data, computer program code for verifying estimated heading information, and computer program code for communicating with server 310. Memory 302 also stores computer program code of one or more applications using heading information. Some of the program code in memory 302 may be similar to the program code in memory 102. In addition, memory 302 could store computer program code configured to realize other functions. In addition, memory 302 could also store other kind of data.

Processor 301 and memory 302 may optionally belong to a chip or an integrated circuit 303, which may comprise in addition various other components, for instance a further processor or memory.

Memory 304 is configured to store path loss model data for one or more geographical sites. Such path loss model data for a site may comprise for example for each WLAN access point that can be detected at the site an estimate position of the WLAN access point, a value relating to a transmission power of the WLAN access point and a path loss exponent. Memory 304 could be configured to store any other desired data as well.

Shift register 305 is configured to store up to five values, more specifically five values representing a heading. Shift register 305 may be designed for instance to be a serial-in and parallel-out shift register. It is to be understood that a shift register with any other predetermined width than five could be used as well.

WLAN component 306 includes at least a WLAN transceiver (TRX). WLAN component 306 enables mobile device 300 to perform radio measurements on radio signals that are broadcast by WLAN access points 340. In addition, it may enable mobile device 300 to establish a connection with WLAN access points 340 for accessing the associated WLAN. It is to be understood that any computer program code based processing required for a WLAN communication could be stored in an own memory of WLAN component 306 and executed by an own processor of WLAN component 306, or it could be stored for example in memory 302 and executed for example by processor 301.

Cellular communication component 307 includes at least a cellular transceiver. It enables mobile device 300 to communicate with other entities via cellular communication network 330, for example with server 310. It could be a cellular engine that is configured to take care of all processing required for a cellular communication. Alternatively, at least some of the processing that is required for a cellular communication may be realized by processor 301 executing corresponding additional program code stored in memory 302.

Display 308 could be a touchscreen or a display that is not touch sensitive.

Motion sensors 309 may comprise for example a gyroscope and/or magnetometers.

It is to be understood that mobile device 300 could comprise various other components, like various user input means and speakers.

Component 303 or mobile device 300 could be an example embodiment of an apparatus according to the invention.

Location server 310 is a server that is configured to store assistance data for a WLAN based positioning. The assistance data may comprise for instance path loss model data for a plurality of access points for each of a plurality of geographical sites. Location server 310 is also configured to provide assistance data to mobile devices via the Internet 320. Server 310 could comprise a memory for storing the assistance data and/or it could be configured to access an external memory storing the assistance data, optionally via another server.

Path loss model data can be obtained in different ways by location server 310. It may be computed by location server 310 based on available information or it may be computed by some other server and provided to location server 310. The available information may comprise information from operators of WLANs about the location, employed transmission power and employed radio signal frequency of their WLAN access points. In this case, a path loss model may be defined by the indicated location of the WLAN access point, the indicated transmission power used by the WLAN access point and a path loss exponent that can be assumed with the given frequency. Alternatively or in addition, the available information may comprise fingerprint data that has been collected by a number of mobile devices at various measurement locations throughout the geographical site. Such fingerprint data may comprise for a respective measurement location an indication of the measurement location, an identifier of the WLAN access points from which signals are observed at this location and an indication of a received signal strength for each of the identified WLAN access points. In this case, a path loss model may be defined by an estimation of the location of the WLAN access point, an estimation of an apparent transmission power used by the WLAN access point for transmitting signals and an estimated path loss exponent. The parameter values for such a path loss model could be estimated for example using a standard radio signal propagation model and the Gauss-Newton algorithm for a non-linear fitting problem.

Cellular communication network 330 could be any kind of cellular communication network, like a Global System for Mobile Communications (GSM), a CDMA2000, a Universal Mobile Telecommunications System (UMTS), or a long term evolution (LTE) based communication network.

The WLAN access points 340 could be access points of one or more WLANs. The WLAN or WLANs may but do not have to be connected to the Internet 320.

Figure 4:
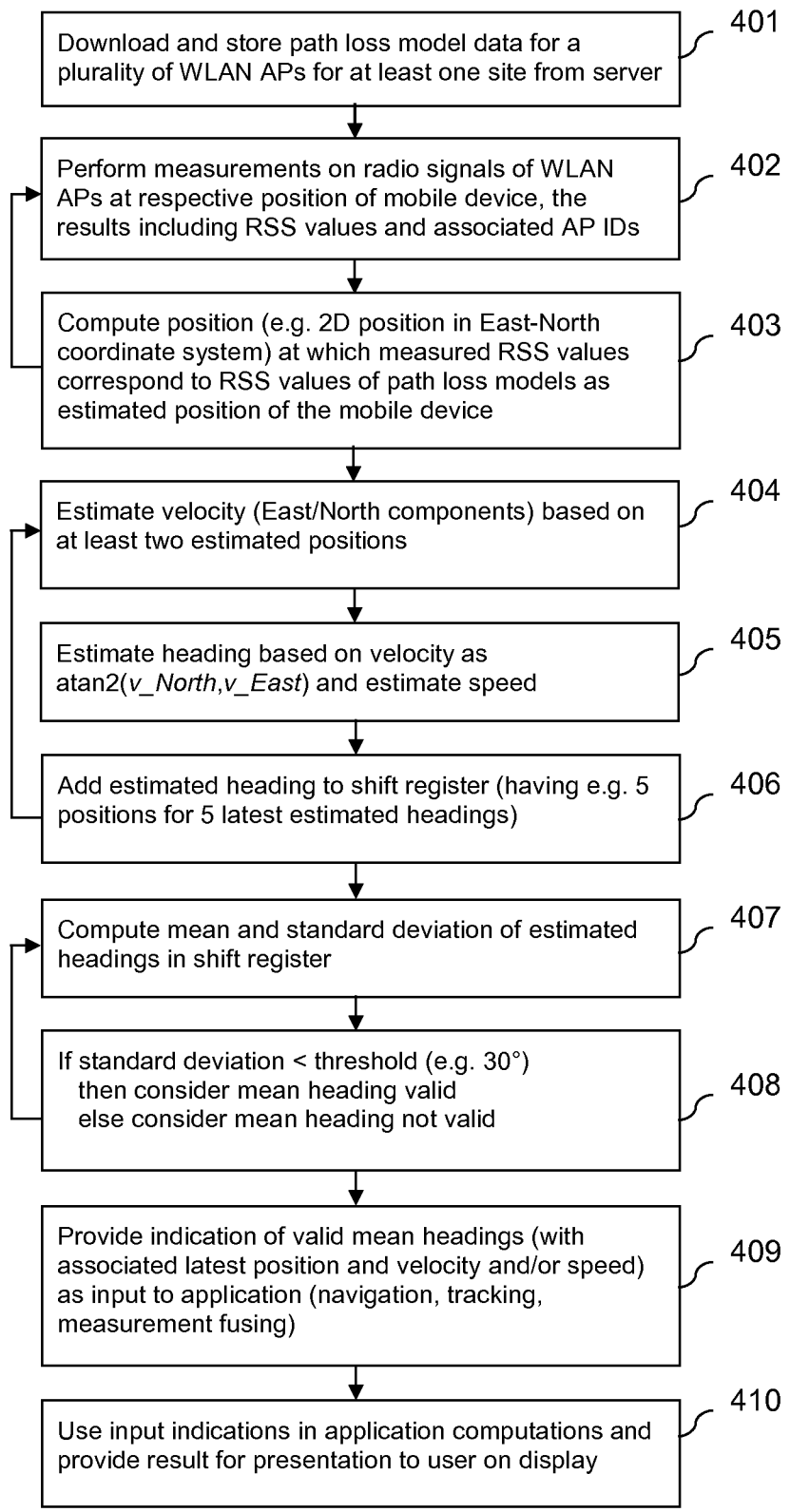
FIG. 4 is a flow chart illustrating example operations in the system of FIG. 3.

FIG. 4 is a flow chart illustrating example operations in the system of FIG. 3.

Processor 301 and some of the program code stored in memory 302 may cause mobile device 300 of FIG. 3 to perform the presented actions when the program code is retrieved from memory 302 and executed by processor 301.

In order to enable mobile device 300 to determine its position offline at certain geographical sites, for instance in a selected number of buildings, a user of mobile device 300 may request mobile device 300 to download path loss data for these sites. Thereupon, mobile device 300 may download path loss model data for the selected sites from server 310 and store the data in memory 304 for immediate or future use. (action 401)

When an application running on mobile device 300 needs to track current position and heading of mobile device 300, mobile device 300 triggers a measurement of radio signals, which are transmitted by WLAN access points 340 in the environment, by means of WLAN transceiver 306. Thereupon, WLAN transceiver 306 performs radio measurements at the current position of mobile device 300 to enable a WLAN based positioning of mobile device 300. The measurement results include for each access point that is observed at the current position an identifier (ID) of the access point and a signal strength related value indicating a measured signal strength of a signal transmitted by the identified access point. (action 402) The identifier of each access point may comprise, for example, a basic service set identification (BSSID), like the medium access control (MAC) address of the observed access point, and the service set identifier (SSID) of the observed access point. The signal strength related value may be an indication of a received signal strength (RSS), for example a received signal strength indicator (RSSI) or a physical Rx level in dBm with a reference value of 1 mW.

Mobile device 300 may then estimate its current position based on the measurement results and on stored path loss model data for the site at which mobile device 300 is located. The site may be known from example an input by the user of mobile device 300, or it may be determined based on some other type of positioning that is used otherwise by mobile device 300, like a satellite signal based positioning or a cellular based positioning.

Mobile device 300 computes a position at which a set of currently measured RSS values of several access points corresponds to RSS values of the path loss models for which data is are available for these access points for the current site. This computed position is used as the estimated current position of mobile device 300. (action 403) The position may be for instance a two-dimensional position in any kind of coordinate system, for example an East-North coordinate system. It is to be understood that, alternatively, it could also be a three-dimensional position.

The radio scan of action 402 and the positioning of action 403 are repeated at regular intervals as mobile device 300 moves along, for example once per second, until the application requiring the position and heading information is stopped.

Once two or more positions have been determined, mobile device 300 estimates in addition its velocity. (action 404) A separate velocity component is determined for each direction in the employed coordinate system. For example, in the case of an East-North coordinate system, a velocity component in East direction and a velocity component in North direction are determined. In a very simple approach, velocity components v_East and v_North could be determined as $$v\_East = v\_East(k) = \frac{x(k) - x(k-1)}{t(k) - t(k-1)},$$

$$v\_North = v\_North(k) = \frac{y(k) - y(k-1)}{t(k) - t(k-1)}$$

where v_East(k) represents a velocity component in East direction at instance k, where v_North(k) represents a velocity component in North direction at instance k, where x(k) represents an East-coordinate of a determined latest position at instance k, where y(k) represents a North-coordinate of the determined latest position at instance k, where x(k−1) represents an East-coordinate of a determined position at a preceding instance k−1, where y(k−1) represents a North-coordinate of the determined position at preceding instance k−1, where t(k) represents the point of time for which the position at instance k was determined, and where t(k−1) represents the point of time for which the position at instance k−1 was determined.

It is to be understood that the velocity components can be determined in more refined manners, for example using a suitable velocity filter, which receives position estimates as input.

Based on the currently determined velocity components v_East and v_North, mobile device 300 estimates its current heading. (action 405) Since the velocity components provide information of delta movement in east and north direction, the heading can be estimated for instance as a tan 2(v_North, v_East), which may be defined for example as follows:

$$\text{atan2}(v\_North, v\_East) := \begin{cases} \arctan\frac{v\_North}{v\_East} & \text{for } v\_East > 0 \\ \arctan\frac{v\_North}{v\_East} + \pi & \text{for } v\_East < 0, v\_North \geq 0 \\ \arctan\frac{v\_North}{v\_East} - \pi & \text{for } v\_East < 0, v\_North < 0 \\ +\pi/2 & \text{for } v\_East = 0, v\_North > 0 \\ -\pi/2 & \text{for } v\_East = 0, v\_North < 0 \\ 0 & \text{for } v\_East = 0, v\_North = 0 \end{cases}$$

The resulting heading is an angle relative to an East axis of the East-North coordinate system in a range from 180° to −180°.

It is to be understood that other definitions for a tan 2(v_North, v_East) could be used as well. For example, the case v_East=0, v_North=0 could also remain undefined, since in case of no movement, there is also no heading.

Mobile device 300 may also estimate its current speed based on the currently determined velocity components, for example as $$speed = \sqrt{v\_North^2 + v\_East^2}.$$

Mobile device 300 may then input the estimated heading into shift register 305 (action 406) and continue with action 404. As a result, a sequence of headings is estimated and input to shift register 305.

If shift register 305 has N=5 positions, for example, always the latest five estimated headings may be available. Shift register 305 may thus save a brief history of estimated headings.

As soon as the shift register 305 has been filled for the first time, mobile device 300 may compute the mean and the standard deviation of the estimated headings currently stored in shift register 305. (action 407)

The mean of the N headings $h_i$, with i=1 . . . N, may be computed for example as sample mean $\bar{h}$ using the following equation:

$$\bar{h} = \frac{1}{N}\sum_{i=1}^{N} h_i$$

and the standard deviation may be computed for example as corrected sample standard deviation sd using the following equation:

$$sd = \sqrt{\frac{1}{N-1}\sum_{i=1}^{N}(h_i - \bar{h})^2}$$

It is to be understood that instead of the corrected sample standard deviation, also the uncorrected sample standard deviation could be used. Using sample mean and sample standard deviation may be more effective than other approaches for determining mean and/or standard deviation.

It is further to be understood that the discontinuity at the boundaries of a used range of degrees should be taken into account when determining mean and standard deviation. For instance, if the headings are indicated in degrees between 180° and −180°, with 0° corresponding to the positive East direction, the mean of just two example values 170° and −170° should result in a mean of 180° rather than in a mean of 0°. To provide a very simple and rough example for taking account of the discontinuity, if the current headings comprise values between 90° and 180° as well as values between −180° and −90°, the values between −180° and −90° could be mapped to values between 180° and 270°, before mean and standard deviation are computed. If the resulting mean is larger than 180°, it may further be mapped to a corresponding value between −180° and −90° again, after the standard deviation has been computed. This approach is based on the assumption that it is unlikely that in this case, further values are present in the other two quadrants between 90° and −90°. It is to be understood that the removal of discontinuities can be performed in more refined manners, one possibility being presented further below.

If the computed standard deviation falls short of a predetermined threshold, mobile device 300 considers the computed mean heading as being valid. Otherwise, mobile device 300 does not consider the computed mean heading as being valid. The predetermined threshold could be set for instance to 30° or to any other value. (action 408)

Mobile device 300 may continue with action 407 once the next heading estimated in action 405 has been entered into shift register 305 in action 406, in order to update and validate the mean heading continuously while mobile device 300 moves along. In this embodiment, the mean that is determined in action 407 may be a moving mean and the standard deviation that is determined in action 407 may be a moving standard deviation. That is, only one heading used for computing mean and standard deviation changes from one iteration to the next. This may have the effect that a particularly smooth sequence of mean headings can be obtained.

In parallel, mobile device 300 may provide an indication of the respective mean heading, if considered valid and thus an indication of the current heading of mobile device 300, as an input to the application. Additional inputs may comprise the latest position as determined in action 403 and the latest velocity as determined in action 404 and/or the latest speed as determined in action 405. (action 409) The application may be any application that needs a reliable heading of mobile device 300 for its operation. The application may be a tracking application which is designed to present to a user the current position of mobile device 300 on a map on a display and to indicate in addition the heading of the mobile device 300, for instance by indicating the position by means of an arrow pointing in the direction of the heading. The application may be a navigation application, which requires the heading of mobile device 300 for providing correct routing instructions to a user via a display or a speaker. The application may be a fusing application, which is designed to fuse the measurements of motion sensors 309. Such motion sensors 309 may provide a relative position of mobile device 300 for a short duration of time, but the use of such relative positions for obtaining an absolute position requires an absolute position and an absolute heading from some other source as a starting point.

A valid current heading can also be used to fuse measurements from gyroscopes and magnetometers to improved accuracy of user heading which is essential for getting location from sensors. For example, a magnetometer may provide an absolute heading from north. A gyroscope, once initialized with an absolute heading, may provide accurate heading information for some time until a drift of the gyroscope affects its estimations. Gyroscopes may need a correction with absolute values for instance every 2 to 5 minutes. A heading that is estimated based on radio signals can be used to correct the drift of gyroscopes. Also headings provided by a magnetometer may be corrected with a heading estimated based on radio signals, as the performance of a magnetometer is sensitive to surrounding ferromagnetic materials causing disturbances. These disturbances may be detected and corrected by means of a heading that is determined based on radio signals. Additionally, a combination of all three approaches can be realized using filters. In general, knowledge about a valid current heading may provide a good extra observation for a heading, which may be beneficial for various estimation processes.

The application uses the input values in computations and provides the result for presentation to a user of mobile device 300 via a suitable user interface, like display 308. (action 410)

Figure 5:
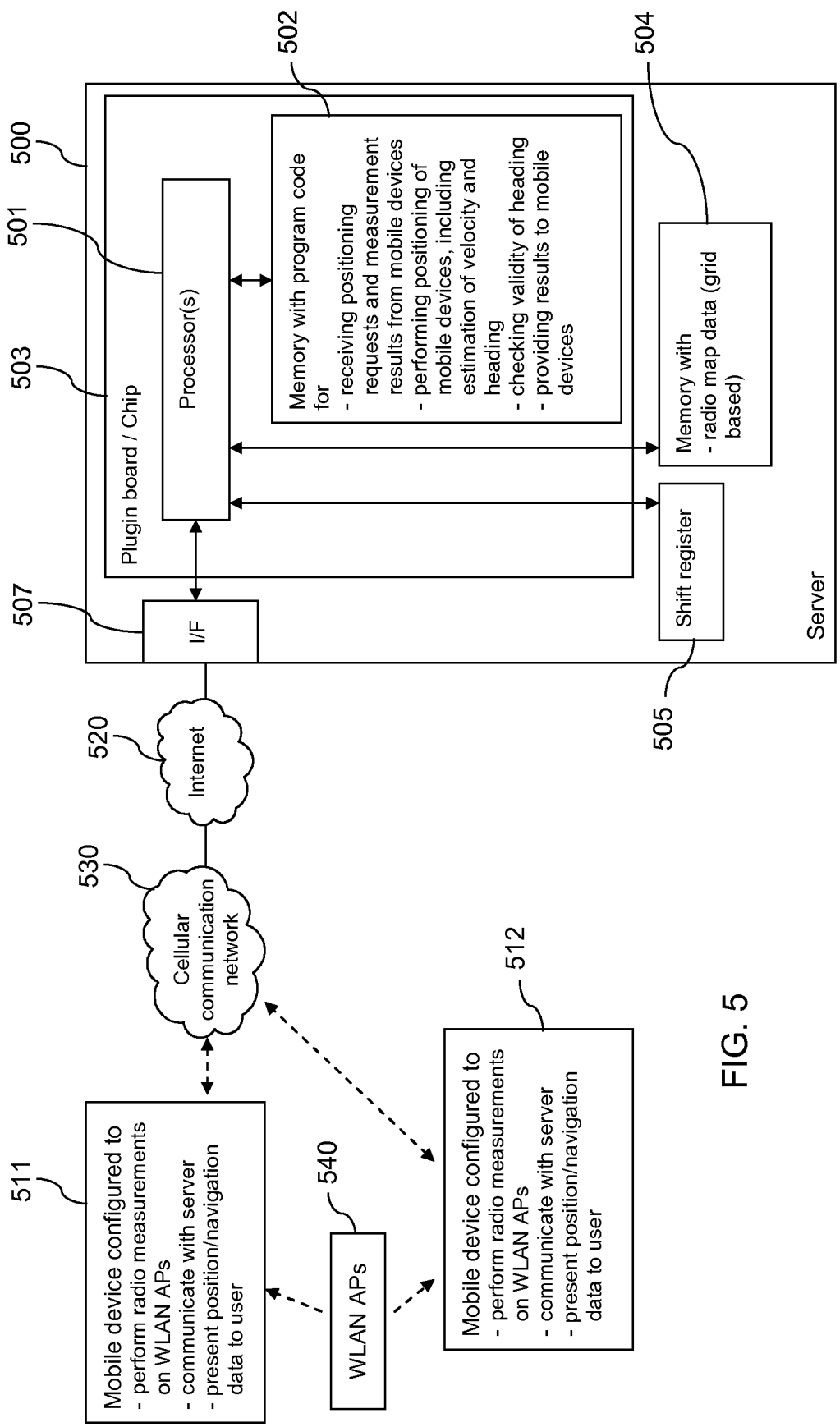
FIG. 5 is a schematic block diagram of a second example embodiment of a system.

FIG. 5 is a schematic block diagram of a second example embodiment of a system according to the invention. In this case, a server is configured to verify and provide heading information.

The system comprises a server 500 and a plurality of mobile devices 511, 512. The system further comprises a network 520, by way of example the Internet. The system further comprises a cellular communication network 530 that is connected to the Internet 520. The system further comprises a number of WLAN access points 540.

Server 500 may be for instance a server that is provided specifically for performing positioning computations for mobile devices 511, 512 based on information about WLAN access points 540 detected by the mobile devices 511, 512 and on stored radio map data. Alternatively, it could be a learning and positioning server which also takes care of generating and updating radio map data for a WLAN based positioning, or it could be any other server. Server 500 comprises a processor 501 that is linked to a first memory 502, to a second memory 504, to a shift register 505 and to an interface (I/F) 507.

Processor 501 is configured to execute computer program code, including computer program code stored in memory 502, in order to cause server 500 to perform desired actions.

Memory 502 stores computer program code for performing a positioning of mobile devices 511, 512 upon request based on results of measurements on radio signals provided by the mobile devices 511, 512 and on stored radio map data, computer program code for verifying heading information that is estimated in the scope of a positioning, and computer program code for providing results of the positioning to the requesting mobile devices 511, 512. Some of the program code may be similar to the program code stored in memory 102. In addition, memory 502 could store computer program code configured to realize other functions, for instance for providing assistance data to mobile devices upon request. In addition, memory 502 could also store other kind of data.

Processor 501 and memory 502 may optionally belong to a plug-in board or a chip with an integrated circuit 503, which may comprise in addition various other components, for instance a further processor or memory.

Memory 504 is configured to store positioning assistance data on a per site basis. It is configured to store for example data of a grid based radio map for each of a plurality of geographical sites. A grid for a particular site may represent the geographical area of a site, with each grid point corresponding to a geographical location at the site. The data of a grid based radio map may then comprise for each grid point an identifier of each WLAN access point that may be expected to be observed at the location represented by the grid point and an indication of a received signal strength that can be expected to be observed at the location represented by the grid point. In addition, memory 504 could store other data.

The grid data can be obtained in different ways. It may be assembled by server 500 or by some other server. Some server may map the results of measurements from fingerprints collected by a plurality of surveying devices to grid points of one or more grids. A grid could be defined for example for each floor of a building. Each grid could be for example a uniformly spaced rectangular two-dimensional grid representing a geographical area that includes the area of one of the floors of the site. Each grid could have for instance grid step of 10 meters in each direction. The measurement results in each of the fingerprints could then be mapped to a grid point of the grids that is provided for one of the floors. Each grid point could represent a particular geographic location of the surveyed localization area and possibly of some surrounding area. The correct floor and thus the correct grid could be determined based on an altitude component in the location that is indicated in the respective fingerprint and on knowledge about the floor height in a building. The grid point to which the measurement results of a particular fingerprint are mapped could be the grid point that corresponds to a real geographic location that is closest to the horizontal location indicated in the fingerprint. If the measurement results for the same WLAN access point from several fingerprints have to be mapped to the same grid point, an average value of the received signal strength could be used, for example. For all grid points of the grid to which no measurement results have been mapped, corresponding values may be determined by interpolation, as far as possible, and otherwise by extrapolation. The result can be considered to be a radio map, which indicates for various locations corresponding to a grid point an expected RSS value for one or more WLAN access points 540. Alternatively, some server could compute parameter values of a path loss model for all relevant WLAN access points 540, as described with reference to FIG. 3. The path loss models could then be used for determining expected RSS value for one or more WLAN access points for each grid point of a grid.

It is to be understood that the data of memory 504 could also be distributed to several memories, which may be partly or completely external to server 500. For example, all or part of the data could be stored at an external memory that is accessible via another server.

Shift register 505 is configured to store up to five values, more specifically five values representing a respective heading. Shift register 505 may be designed for instance to be a serial-in and serial-out shift register. Again, it is to be understood that a shift register with any other predetermined width than five could be used as well.

Interface 507 is a component which enables server 500 to communicate with other devices, like mobile device 511 and 512, via networks 520 and 530. It could also enable server 500 to communicate with other entities, like other servers or terminals of staff of a positioning service provider operating server 500. Interface 507 could comprise for instance a TCP/IP socket.

It is to be understood that server 500 could comprise various other components.

Component 503 or server 500 could be an example embodiment of an apparatus according to the invention.

Mobile devices 511, 512 may be for instance mobile terminals, like smartphones or tablet PCs. They are configured to perform radio measurements on WLAN access points 540, to communicate with server 500, to perform for instance navigation computations, and to present a position and heading of the mobile device 511, 512 and/or routing information to a user.

Cellular communication network 530 could be again any kind of cellular communication network.

The WLAN access points 540 could be again access points of one or more WLANs. The WLAN or WLANs may but do not have to be connected to the Internet 520.

Figure 6:
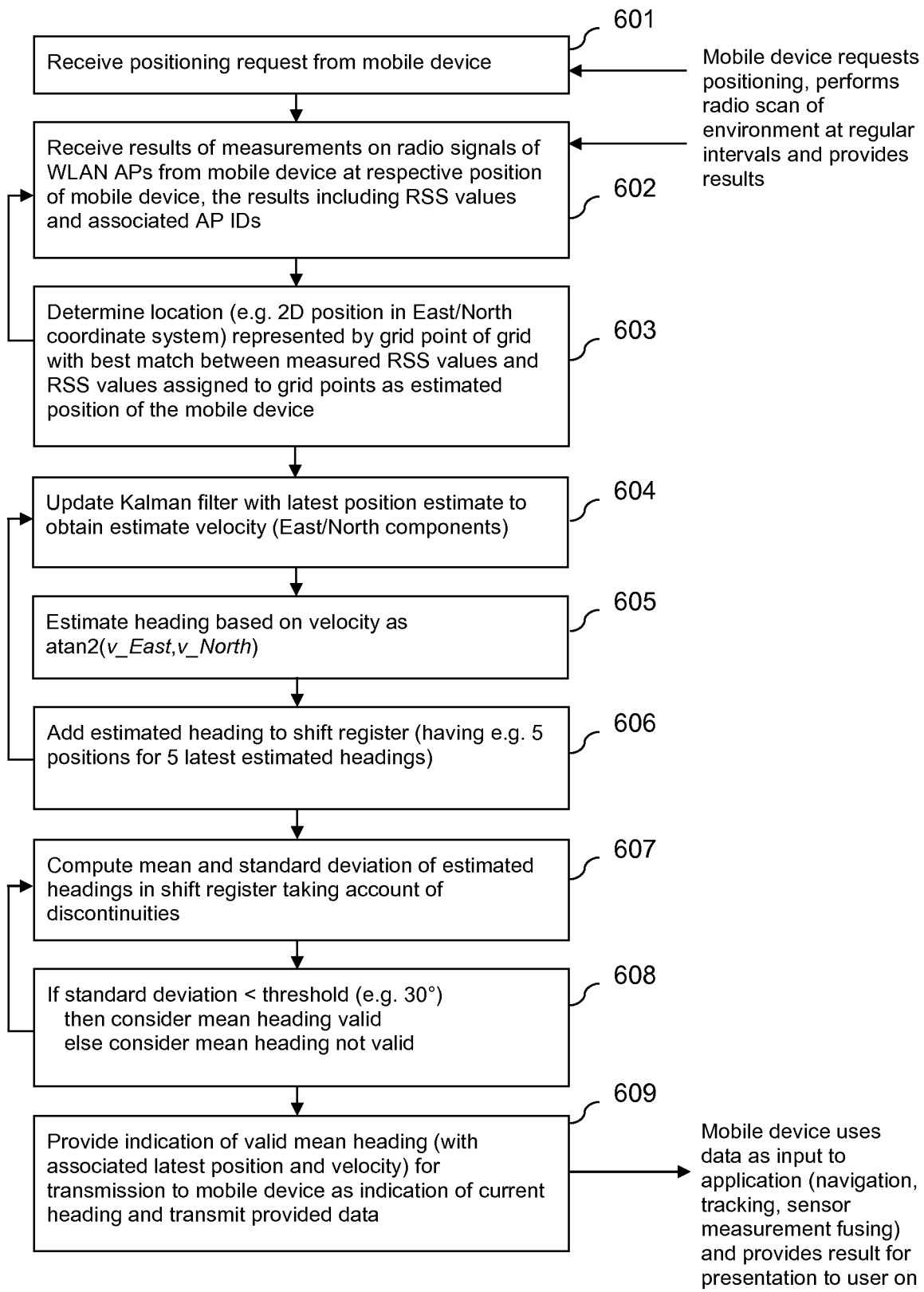
FIG. 6 is a flow chart illustrating example operations in the system of FIG. 5.

FIG. 6 is a flow chart illustrating example operations in the system of FIG. 5.

Processor 501 and some of the program code stored in memory 502 may cause server 500 of FIG. 5 to perform the presented actions when program code is retrieved from memory 502 and executed by processor 501.

When an application running for instance on mobile device 511 needs to track the current position and heading of mobile device 511, it may transmit a positioning request to server 500. In addition, it may trigger a measurement of radio signals transmitted by WLAN access points 504 as described with reference to action 402 and transmit the measurement results to server 500. The provided measurement results may include RSS values and associated WLAN access point identifiers for each location of measurement. The data is transmitted to server 500 via cellular communication network 530 and the Internet 520.

Server 500 receives the positioning request from mobile device 511 and activates positioning computations for mobile device 511. (action 601)

In addition, server 500 receives the measurement results on radio signals of WLAN access points from mobile device 511 at regular intervals. (action 602)

Server 500 may estimate the current position of mobile device 511 based on the latest measurement results and on grid data that is stored in memory 504 for the geographical site at which mobile device 511 is located. An indication of the site may be input for instance by the user of mobile device 511 and provided along with the positioning request, or it may be determined by server 500 in some other manner, for instance by comparing the provided access point identifiers with the access point identifiers included in the grid data for each site. The position is estimated by determining the grid point of the selected grid with the best match between the measured RSS values for indicated WLAN access points and the RSS values that are assigned to a respective grid point for the same WLAN access points. The geographical location represented by the grid point with the best match is considered to be the estimated position of mobile device 511. (action 603) The position may be for instance a two-dimensional position in any kind of coordinate system, for example an East-North coordinate system. It is to be understood that alternatively, the position could also be a three-dimensional position or a two-dimensional position associated with a floor number.

A new position is estimated in action 603 whenever new results of measurements are received from mobile device 511 in action 602, until mobile device 511 terminates the positioning request.

With each estimated position, server 500 updates a constant velocity Kalman filter to obtain a velocity estimate for mobile device 511. The output is a two-dimensional velocity. For example, in the case of an East-North coordinate system, a velocity component in East direction v_East and a velocity component in North direction v_North are determined. (action 604) A possible implementation of the Kalman filter will be explained in more detail in the following.

An example velocity filter estimates velocities in a local horizontal plane (East-North coordinate system). These velocities may then be used to estimate the heading of a mobile device. The velocity filter is a four states filter which estimate position and velocities in East and North directions. Let x represent the state of a velocity filter, which may be defined as $$x = \begin{pmatrix} e \\ V_e \\ n \\ V_n \end{pmatrix},$$

where e is the position coordinate on the East coordinate axis, $V_e$ is the velocity in East direction (corresponding to v_East), n is the position coordinate on the North coordinate axis and $V_n$ is the velocity in North direction (corresponding to v_North).

The state transition matrix F of the Kalman filter may be defined as $$F = \begin{pmatrix} 1 & dt & 0 & 0 \\ 0 & 1 & 0 & 0 \\ 0 & 0 & 1 & dt \\ 0 & 0 & 0 & 1 \end{pmatrix},$$

where dt is the time difference between the current time and the time of last fix of the Kalman filter.

The process noise covariance matrix Q of Kalman filter may be defined as $$Q = \begin{pmatrix} dt^3/3 & dt^2/2 & 0 & 0 \\ dt^2/2 & dt & 0 & 0 \\ 0 & 0 & dt^3/3 & dt^2/2 \\ 0 & 0 & dt^2/2 & dt \end{pmatrix}.$$

The measurement transition matrix H may be defined as $$H = \begin{pmatrix} 1 & 0 & 0 & 0 \\ 0 & 0 & 1 & 0 \end{pmatrix}.$$

The measurement noise covariance matrix R may be defined as $$R = P_{WLAN}.$$

The observation of state Z may be defined as $$z = x_{WLAN},$$

where the observation of the user state $x_{WLAN}$, which includes the position of a mobile device in an East-North coordinate system, may be defined as $$x_{WLAN} = \begin{pmatrix} e \\ n \end{pmatrix}.$$

A covariance matrix $P_{WLAN}$ of the position calculated based on WLAN signals may be defined as $$P_{WLAN} = \begin{pmatrix} \delta_e^2 & \delta_e \delta_n \\ \delta_n \delta_e & \delta_n^2 \end{pmatrix},$$

where δ is the standard deviation in the respective direction and also estimated from radio measurements.

Figure 7:
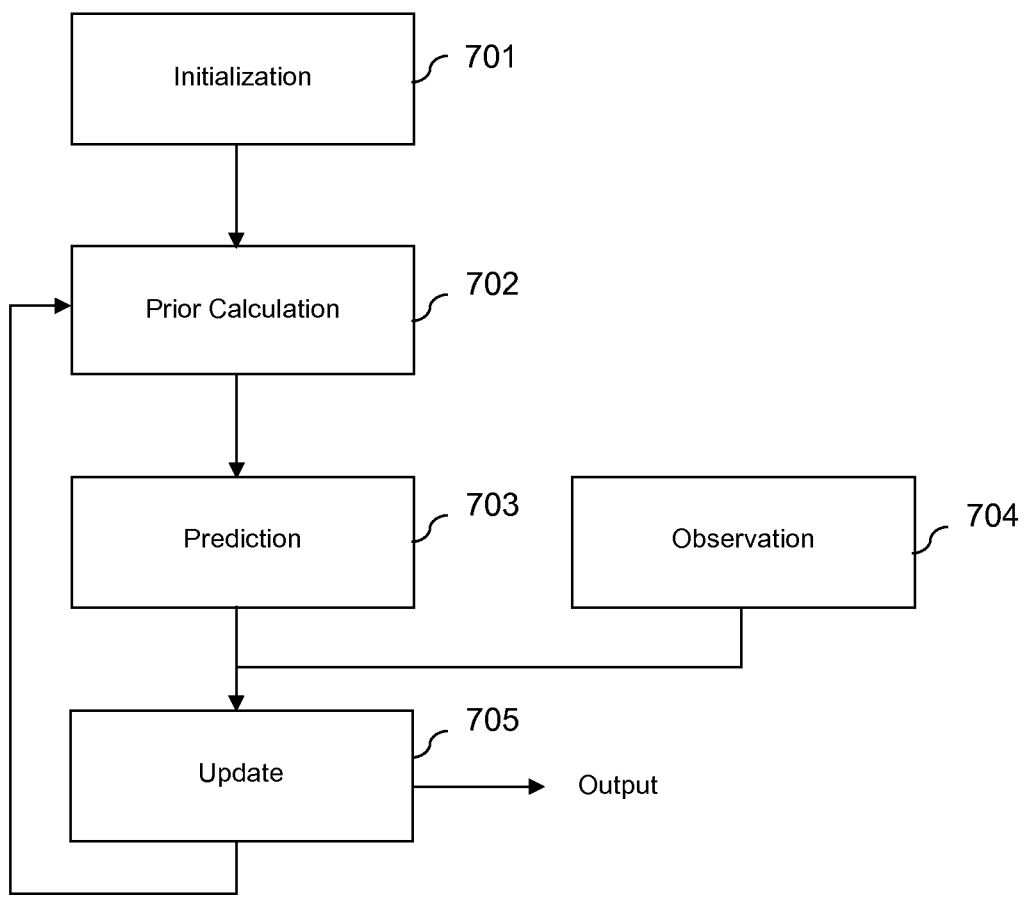
FIG. 7 is a flow chart illustrating the removal of the effects of a discontinuity at the boundaries of a heading range.

The Kalman filter operation is illustrated in FIG. 7. The filter runs recursively and uses the equations described below. The recursion is done either with a predefined time interval, or whenever a new observation of state is available, or a combination of both predefined time and availability of new observation of state. In the following, one exemplary implementation of the filter is described, which uses observation obtained from a WLAN based positioning, e.g. as described with reference to actions 601 to 603.

The above definitions for the velocity filter will be used, except for the addition of the following subscripts:
k=1, 2, 3 . . . : presents discreet time measurement, values of k are predetermined interval of time
k/k−1: prediction of quantities
k/k: posterior quantities at current time epoch k
k−1/k−1: posterior estimated at one time stamp before State and covariance of state can be initialized with constant values at the start of the filter. (action 701) For example, state x and covariance matrix P of the velocity filter can be initialized for example at k=0:

$$x_{0/0} = \begin{pmatrix} 0 \\ 0 \\ 0 \\ 0 \end{pmatrix} \text{ and } P_{0/0} = \begin{pmatrix} 1000 & 1000 & 1000 & 1000 \\ 1000 & 1000 & 1000 & 1000 \\ 1000 & 1000 & 1000 & 1000 \\ 1000 & 1000 & 1000 & 1000 \end{pmatrix}$$

Next, a prior is initialized with some constants for the very first run of the Kalman filter, i.e. for k=0. (action 702) For the estimation of the state x at time k>0, prior values of the filters are assigned with last posterior estimate done by the Kalman filter.

$$x_{k-1/k-1}$$

$$P_{k-1/k-1}$$

Next, a prediction of the state x and its covariance matrix P is calculated. (action 703) The prediction process takes the prior values and predicts the state and the matrix using following equations:

$$x_{k/k-1} = F_k * x_{k-1/k-1}$$

$$P_{k/k-1} = F_k * P_{k-1/k-1} * F_k' + Q_k$$

Furthermore, an observation of state z is obtained from the WLAN based position estimate $x_{WLAN}$: (action 704):

$$z_k = x_{WLAN_k}$$

The WLAN based position estimate, the state and its covariance can be determined using fingerprinting, path loss model etc.

Finally, the state is updated with the following steps (action 705):

Innovations $nu_k$ and innovation covariance matrix $S_k'$ are determined using the following equations:

$$nu_k = z_k * H_k * x_{k/k-1}$$

$$S_k = R_k + H_k * P_{k/k-1} * H'_k$$

The Kalman gains can be calculated using following equation:

$$K_k = P_{k/k-1} * H'_k * \text{inverse}(S_k)$$

The posterior state is calculated as follows:

$$x_{k/k} = x_{k/k-1} + K_k * nu_k$$

$$P_{k/k} = P_{k/k-1} - K_k * S_k * K_k'$$

This posterior state also represents the output of the Kalman filter indicated in FIG. 7.

Therefore the recursive velocity Kalman filter algorithm may have the following form including steps 0 to 5:
0. Initialize prior position and velocity and respective covariance matrix:

$$x_{0/0} = \begin{pmatrix} 0 \\ 0 \\ 0 \\ 0 \end{pmatrix} \quad P_{0/0} = \begin{pmatrix} 1000 & 1000 & 1000 & 1000 \\ 1000 & 1000 & 1000 & 1000 \\ 1000 & 1000 & 1000 & 1000 \\ 1000 & 1000 & 1000 & 1000 \end{pmatrix}$$

For k=1, 2, 3, . . . do the following
1. Set state transition matrix and measurement matrix at time k:

$$F_k = \begin{pmatrix} 1 & dt & 0 & 0 \\ 0 & 1 & 0 & 0 \\ 0 & 0 & 1 & dt \\ 0 & 0 & 0 & 1 \end{pmatrix}$$

$$H_k = \begin{pmatrix} 1 & 0 & 0 & 0 \\ 0 & 0 & 1 & 0 \end{pmatrix}$$

2. Set process noise covariance at time k:

$$Q_k = \begin{pmatrix} dt^3/3 & dt^2/2 & 0 & 0 \\ dt^2/2 & dt & 0 & 0 \\ 0 & 0 & dt^3/3 & dt^2/2 \\ 0 & 0 & dt^2/2 & dt \end{pmatrix}$$

3. Obtain measurement and measurement covariance (position calculated using WLAN signals and its uncertainty) at time k:

$z_k = x_{WLAN}$ $R_k = P_{WLAN}$

4. Calculate posterior at time k, using prior and measurement at time k:

$x_{k/k-1} = F_k * x_{k-1/k-1}$ $P_{k/k-1} = F_k * P_{k-1/k-1} * F_k' + Q_k$ $nu_k = z_k - H_k * x_{k/k-1}$ $S_k = R_k + H_k * P_{k/k-1} * H_k'$ $K_k = P_{k/k-1} * H_k' * \text{inverse}(S_k)$ $x_{k/k} = x_{k/k-1} + K_k * nu_k$ $P_{k/k} = P_{k/k-1} - K_k * S_k * K_k'$ 5. Output posterior $x_{k/k}$, $P_{k/k}$ as an estimate of current state, and continue from step 1.

Based on the currently determined velocity components v_East and v_North, e.g. from Kalman filter output posterior $x_{k/k}$, server 500 estimates the current heading of mobile device 511 from North. The heading can be estimated, for instance, as a tan 2(v_East, v_North), with a definition analog to the one presented above for a tan 2(v_North, v_East) with reference to action 405. (action 605)

Server 500 may then input the estimated heading into shift register 505 (action 606) and continue with action 604. As a result, a sequence of headings is estimated and input to shift register 505. If shift register 505 has N=5 positions, for example, always the latest five estimated headings may be available.

As soon as the shift register 505 has been filled for the first time, server 500 computes the mean and the standard deviation of the estimated headings currently stored in shift register 505. (action 607)

As indicated above, a discontinuity appears at the boundaries of the range of the heading. There are two typical scales widely used for presenting headings from North. Scale 1 has a range from 0° to 360° in clockwise direction starting from North and Scale 2 has range from −180° to 180° in clockwise direction, with 0° corresponding to North direction. Both scales suffer from discontinuity, though at different locations. Scale 1 suffers from discontinuity at the location where the scale starts/end i.e. at 0° and 360°. That is, a change of heading of 1° from 0° in counter clockwise direction produces an output equal to 359°. In Scale 2, a discontinuity appears at the transition from −180° to 180°. That is, a change of heading by 1° at 180° in clock wise direction produces an output equal to −179°. These discontinuities should be removed while calculating mean and standard deviation of headings, since they may result in an error in the estimates. Scale 2 also represents the range of a tan 2 which has been used to calculate the heading, so it should be treated properly for calculating mean and standard deviation.

Figure 8:
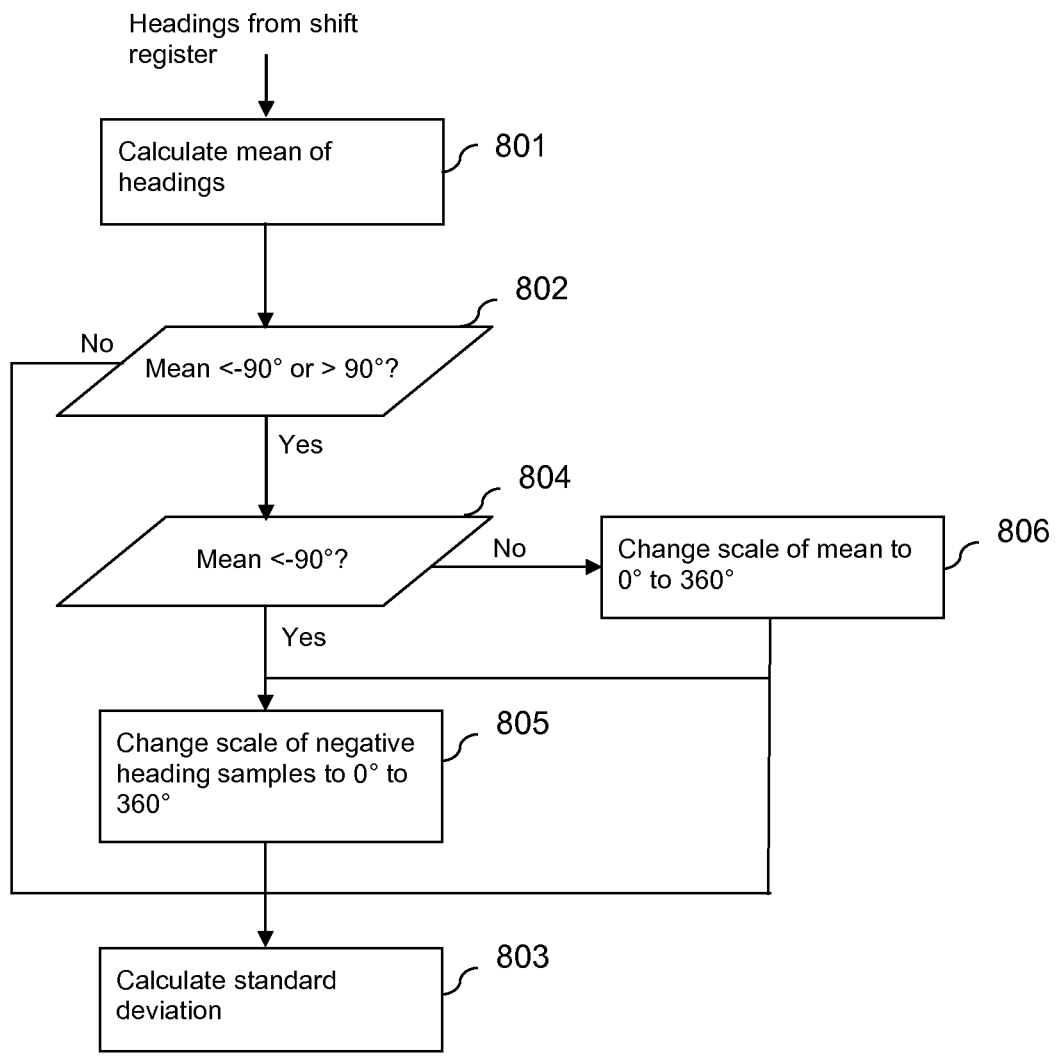
FIG. 8 is a flow chart illustrating a Kalman filter operation.

In the computation of the mean and the standard deviation in action 607, the discontinuity is removed therefore from the headings, as will be described with reference to FIG. 8.

The discontinuity in the mean can be removed by using following formula for computing the mean heading (action 801):

mean Sin=mean(sin $\theta_i$)

mean Cos=mean(cos $\theta_i$)

meanHeading=a tan 2(mean Sin,mean Cos), with $\theta_i$ being the value of the ith heading in degree, with i=1 . . . 5.

A discontinuity affecting the standard deviation is removed by checking the mean heading that has been calculated with the above procedure.

If it is determined that the mean heading is not in the lower semi-circle presenting the heading range, i.e. 90°<heading<−90° (action 802), then the standard deviation may be computed in a conventional manner with the headings taken from shift register 505 and the mean heading determined in action 801. (action 803)

If it is determined that the mean heading is in the lower semi-circle presenting the heading range (action 802), then a special handling is applied to the headings taken from shift register 505 to estimate their standard deviation.

If it is determined that the mean heading is in the lower semi-circle presenting the heading range (action 802) and that the mean heading is smaller than −90° (action 804), the scale of the negative headings taken from shift register 505 is changed to 0° to 360° (action 805). Then, the standard deviation may be computed in a conventional manner with the adjusted headings and the mean heading determined in action 801. (action 803)

If it is determined that the mean heading is in the lower semi-circle presenting the heading range (action 802) but that it is not smaller than −90° (action 804), the scale of the mean heading is changed to 0° to 360° (action 806). In addition, the scale of the negative headings is changed to 0° to 360°. (action 805) Then the standard deviation may be computed in a conventional manner with the adjusted headings and the adjusted mean heading. (action 803)

If the computed standard deviation falls short of a predetermined threshold, server 500 considers the computed mean heading to be valid. Otherwise, server 500 does not consider the computed mean heading to be valid. The predetermined threshold could be set for instance to 30° or to any other value. (action 608)

Alternatively, the uncertainty of velocity components output by the velocity Kalman filter can be used as a validity measure for the estimated heading. For example, if the variances of the velocity components estimated by the Kalman filter are large relative to the velocity components, then the estimated velocity and hence the heading is not reliable. As described above, a velocity Kalman filter provides a vector including a 2D or 3D position and a 2D or 3D velocity vector, and a corresponding covariance matrix of the vector components. Thus, the covariance of velocity vector can be used as a validity measure for the estimated heading as well.

Server 500 may continue with action 607, in order to update and validate the mean heading continuously while mobile device 511 moves along. In this embodiment, the headings could be retrieved for example one after the other at a single output of shift register 505 while new headings are input to shift register 505. As a result, the five headings from shift register 505 that are used for computing a respective mean and standard deviation are replaced completely from one iteration to the next. In case the amount of data that is to be provided to mobile device 511 in response to its request is to be limited, this may have the effect that the amount of computations that have to be performed for computing the data can be limited in the first place.

If and only if a mean heading has been determined to be valid in action 608, server 500 provides an indication of this mean heading as an indication of the current heading of mobile device 511 for transmission. The indication of current heading is provided along with the latest estimated position that was used as a basis for determining the current heading and the latest estimated velocity that was used as a basis for determining the current heading. Server 500 transmits the provided data to mobile device 511 via the Internet 520 and cellular communication network 530. (action 609)

Mobile device 511 receives the data and uses the data as input for an application that needs a reliable heading of mobile device 511 for its operation. It could be, for instance, any application of the type as described above with reference to action 409. Mobile device 511 may then present information determined by the application for presentation to a user on a display.

It is to be understood that the presented example systems as well as the presented example operations may be varied in many ways. The operations may be varied for instance by modifying actions, by omitting actions and/or by adding actions. In addition, the order of actions could be modified.

For example, in an alternative embodiment, the radio signals on which measurements are performed by mobile devices in the systems of FIG. 3 or 5 could include signals of other transmitters instead of or in addition to WLAN access point signals, in particular signals of other non-cellular terrestrial communication nodes.

Summarized, certain embodiments of the invention may have the effect that they allow validating an estimated heading of a mobile device and consequently improving the performance of an application that is enabled to use validated headings only. The information may be generated at a mobile device or at a server and it may be exploited in various ways at a mobile device and/or at a server.

A user position may be estimated using radio signals, for instance using a WLAN based positioning. The estimated positions may also be used for estimating the heading of the user. However, due to the presence of noise in, for example, a WLAN based positioning system, it is difficult to determine when the heading calculated from the estimated positions is accurate and when it is a result of inherent noises present in the system. Embodiments of the invention can be used to infer validity to headings estimated in such a system.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 9:
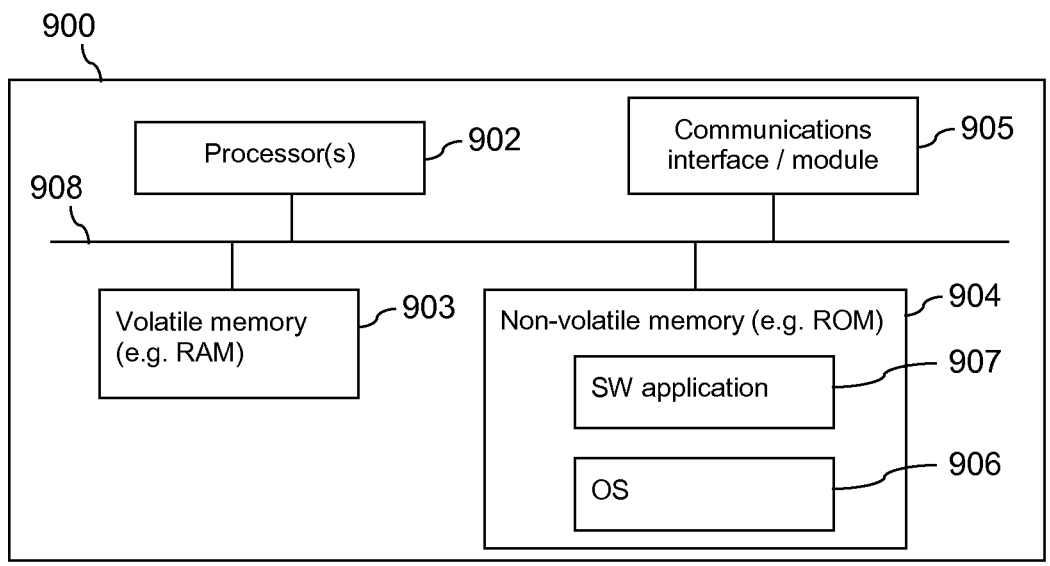
FIG. 9 is a schematic block diagram of an example embodiment of an apparatus.
Figure 10:
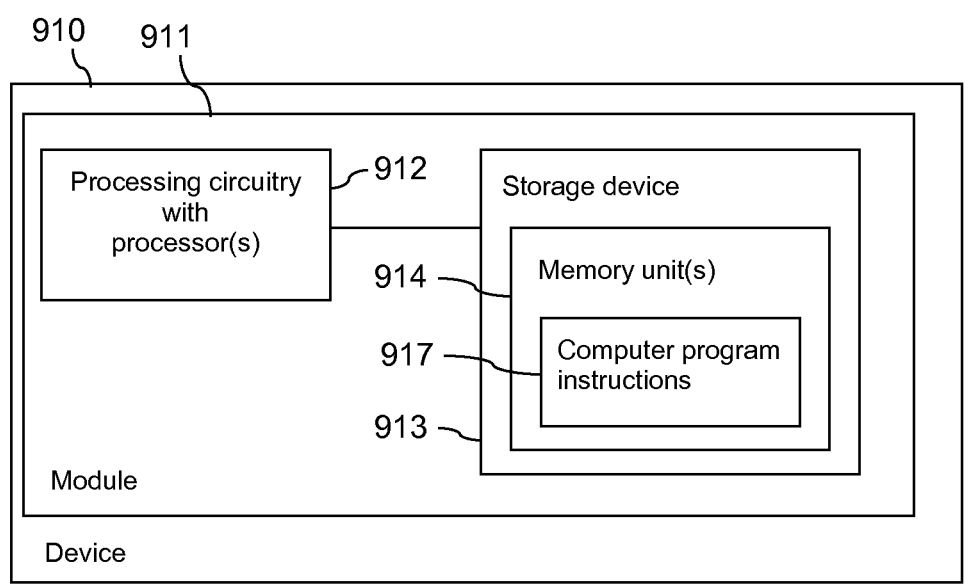
FIG. 10 is a schematic block diagram of an example embodiment of an apparatus.

Example embodiments using at least one processor and at least one memory as a non-transitory data medium are shown in FIGS. 9 and 10.

FIG. 9 is a schematic block diagram of a device 900. Device 900 includes a processor 902. Processor 902 is connected to a volatile memory 903, such as a RAM, by a bus 908. Bus 908 also connects processor 902 and RAM 903 to a non-volatile memory 904, such as a ROM. A communications interface or module 905 is coupled to bus 908, and thus also to processor 902 and memories 903, 904. Within ROM 904 is stored a software (SW) application 907. Software application 907 may be a positioning application, although it may take some other form as well. An operating system (OS) 906 also is stored in ROM 904.

FIG. 10 is a schematic block diagram of a device 910. Device 910 may take any suitable form. Generally speaking, device 910 may comprise processing circuitry 912, including one or more processors, and a storage device 913 comprising a single memory unit or a plurality of memory units 914. Storage device 913 may store computer program instructions 917 that, when loaded into processing circuitry 912, control the operation of device 910. Generally speaking, also a module 911 of device 910 may comprise processing circuitry 912, including one or more processors, and storage device 913 comprising a single memory unit or a plurality of memory units 914. Storage device 913 may store computer program instructions 917 that, when loaded into processing circuitry 912, control the operation of module 911.

The software application 907 of FIG. 9 and the computer program instructions 917 of FIG. 10, respectively, may correspond e.g. to the computer program code in any of memories 102, 302 or 502, respectively.

Figure 11:
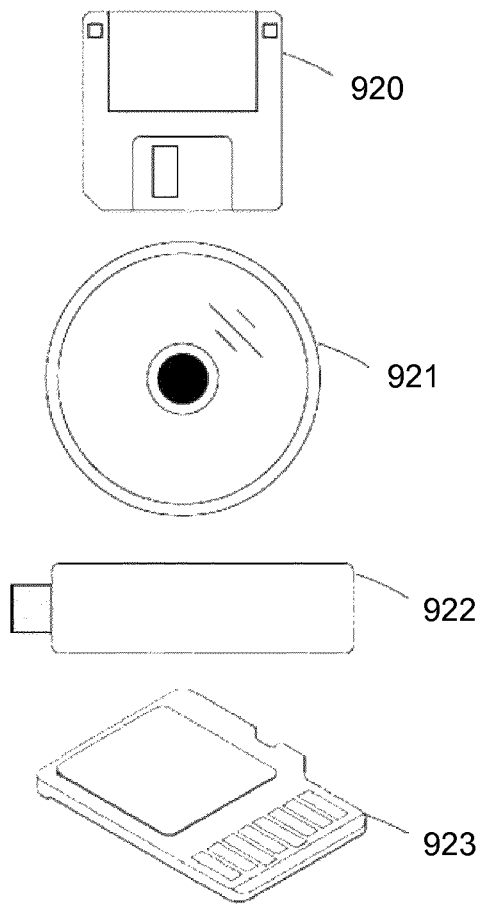
FIG. 11 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 11, which presents, from top to bottom, schematic diagrams of a magnetic disc storage 920, of an optical disc storage 921, of a semiconductor memory circuit device storage 922 and of a Micro-SD semiconductor memory card storage 923.

The functions illustrated by processor 101 in combination with memory 102, or processor 301 in combination with memory 302, or the integrated circuit 303, or processor 501 in combination with memory 502, or the chip 503 can also be viewed as means for estimating successive headings of a mobile device based on respective results of measurements by the mobile device on radio signal transmitted by a plurality of transmitters to obtain estimated headings; means for computing a mean heading based on a predetermined number of the estimated headings and for computing a standard deviation of the predetermined number of estimated headings; means for determining whether the mean heading is to be considered valid based on the computed standard deviation of the estimated headings; and means for providing an indication of the mean heading as an indication of a current heading of the mobile device for use by a specific application only if the mean heading is determined to be considered valid.

The program codes in memories 102, 302 and 502 can also be viewed as comprising such means in the form of functional modules.

FIGS. 2, 4 and 6 may also be understood to represent example functional blocks of computer program codes supporting a verification of heading information of a mobile device and providing heading information.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method, performed by at least one apparatus, comprising:
   estimating successive headings of a mobile device based on respective results of measurements by the mobile device on radio signals transmitted by a plurality of transmitters to obtain estimated headings;
   computing a mean heading based on a predetermined number of the estimated headings and computing a standard deviation of the predetermined number of estimated headings, wherein computing the mean heading comprises removing effects of a discontinuity occurring at boundaries of a used angular range of headings, wherein removing effects of a discontinuity occurring at boundaries at least partially comprises changing a scale of negative heading samples or a scale of the mean heading, at least in an instance in which the mean heading is determined to have a predefined relationship to a first threshold or a second threshold;
   determining whether the mean heading is to be considered valid based on the computed standard deviation of the estimated headings; and
   providing an indication of the mean heading as an indication of a current heading of the mobile device for use by an application only if the mean heading is determined to be considered valid.

2. The method according to claim 1, wherein determining whether the mean heading is to be considered valid comprises:
   comparing the computed standard deviation with a predetermined threshold;
   determining that the mean heading is to be considered to be valid one of if the standard deviation falls short of the predetermined threshold and if the standard deviation is smaller or equal to the predetermined threshold; and
   otherwise determining that the mean heading is to be considered not to be valid.

3. The method according to claim 1, wherein estimating a heading comprises:
   estimating positions of the mobile device based on the results of the measurements on radio signals at the mobile device;
   estimating a velocity of the mobile device based on the estimated positions to obtain an estimated velocity having at least two components for at least two different directions; and
   estimating a heading of the mobile device based on the at least two components of the estimated velocity or estimating a heading and a speed of the mobile device based on the at least two components of the estimated velocity.

4. The method according to claim 3, wherein
   the estimated positions are estimated using stored assistance data; and/or
   the estimated positions are estimated using stored grid data, wherein the grid represents a geographical site, wherein grid points of the grid represent geographical locations and wherein to at least some of the grid points, data is associated which identifies transmitters that can be expected to be observed at the geographical location represented by the grid point and which indicates a signal strength of radio signals of the identified transmitters that can be expected to be measured at the geographical location represented by the grid point; and/or
   the estimated positions are estimated using stored data defining radio models for at least some of the plurality of transmitters; and/or
   the estimated positions are estimated using stored data defining path loss models for at least some of the plurality of transmitters; and/or
   the estimated position is a two dimensional position; and/or the estimated position comprises an East component and a North component for an East-North coordinate system; and/or the estimated velocity is a velocity in a horizontal plane; and/or the estimated velocity comprises an East component and a North component for an East-North coordinate system.

5. The method according to claim 1, wherein computing the standard deviation comprises removing effects of a discontinuity occurring at boundaries of a used range of headings in degrees.

6. The method according to claim 1, wherein the results of measurements at the mobile device include for each of the plurality of transmitters at least a signal strength related value and an identification of the transmitter.

7. The method according to claim 1, wherein the plurality of transmitters comprises:
at least one terrestrial transmitter; and/or
at least one terrestrial cellular transmitter; and/or
at least one terrestrial non-cellular transmitter; and/or
at least one access point of at least one wireless local area network; and/or
at least one Bluetooth transmitter; and/or
at least one Bluetooth low energy transmitter.

8. The method according to claim 1, wherein the application is:
a navigation application; and/or
a position tracking application; and/or
an application matching positions and headings of the mobile device to a map; and/or
an application presenting position and heading of the mobile device to user on a display; and/or
an application fusing measurements of at least two motion sensors.

9. The method according to claim 1, wherein the at least one apparatus is or belongs to:
the at least one mobile device; or
a server that is configured to obtain the results of measurements from a mobile device.

10. A system comprising an apparatus according to claim 9, wherein the apparatus is one of the mobile device and a server, the system further comprising one of: a server, in case the apparatus is the mobile device, and the mobile device, in case the apparatus is a server.

11. An apparatus comprising at least one processor and at least one memory including computer program code, the at least one memory and the computer program code configured to, with the at least one processor, cause the apparatus at least to perform:
estimate successive headings of a mobile device based on respective results of measurements by the mobile device on radio signals transmitted by a plurality of transmitters to obtain estimated headings;
compute a mean heading based on a predetermined number of the estimated headings and compute a standard deviation of the predetermined number of estimated headings, wherein computing the mean heading comprises removing effects of a discontinuity occurring at boundaries of a used angular range of headings, wherein removing effects of a discontinuity occurring at boundaries at least partially comprises changing a scale of negative heading samples or a scale of the mean heading, at least in an instance in which the mean heading is determined to have a predefined relationship to a first threshold or a second threshold;
determine whether the mean heading is to be considered valid based on the computed standard deviation of the estimated headings; and
provide an indication of the mean heading as an indication of a current heading of the mobile device for use by an application only if the mean heading is determined to be considered valid.

12. The apparatus according to claim 11, wherein determining whether the mean heading is to be considered valid comprises:
comparing the computed standard deviation with a predetermined threshold;
determining that the mean heading is to be considered to be valid one of if the standard deviation falls short of the predetermined threshold and if the standard deviation is smaller or equal to the predetermined threshold; and
otherwise determining that the mean heading is to be considered not to be valid.

13. The apparatus according to claim 11, wherein estimating a heading comprises:
estimating positions of the mobile device based on the results of the measurements on radio signals at the mobile device;
estimating a velocity of the mobile device based on the estimated positions to obtain an estimated velocity having at least two components for at least two different directions; and
estimating a heading of the mobile device based on the at least two components of the estimated velocity or estimating a heading and a speed of the mobile device based on the at least two components of the estimated velocity.

14. The apparatus according to claim 13, wherein
the estimated positions are estimated using stored assistance data; and/or
the estimated positions are estimated using stored grid data, wherein the grid represents a geographical site, wherein grid points of the grid represent geographical locations and wherein to at least some of the grid points, data is associated which identifies transmitters that can be expected to be observed at the geographical location represented by the grid point and which indicates a signal strength of radio signals of the identified transmitters that can be expected to be measured at the geographical location represented by the grid point; and/or
the estimated positions are estimated using stored data defining radio models for at least some of the plurality of transmitters; and/or
the estimated positions are estimated using stored data defining path loss models for at least some of the plurality of transmitters; and/or
the estimated position is a two dimensional position; and/or
the estimated position comprises an East component and a North component for an East-North coordinate system; and/or
the estimated velocity is a velocity in a horizontal plane; and/or
the estimated velocity comprises an East component and a North component for an East-North coordinate system.

15. The apparatus according to claim 11, wherein computing the standard deviation comprises removing effects of a discontinuity occurring at boundaries of a used range of headings in degrees.

16. The apparatus according to claim 11, wherein the results of measurements at the mobile device include for each of the plurality of transmitters at least a signal strength related value and an identification of the transmitter.

17. The apparatus according to claim 11, wherein the plurality of transmitters comprises:
- at least one terrestrial transmitter; and/or
- at least one terrestrial cellular transmitter; and/or
- at least one terrestrial non-cellular transmitter; and/or
- at least one access point of at least one wireless local area network; and/or
- at least one Bluetooth transmitter; and/or
- at least one Bluetooth low energy transmitter.

18. The apparatus according to claim 11, wherein the application is
- a navigation application; and/or
- a position tracking application; and/or
- an application matching positions and headings of the mobile device to a map; and/or
- an application presenting position and heading of the mobile device to user on a display; and/or
- an application fusing measurements of at least two motion sensors.

19. The apparatus according to claim 11, wherein the apparatus is one of:
- a chip; and/or
- a module for a server; and/or
- a server; and/or
- a module for a mobile device; and/or
- a mobile device.

20. A non-transitory computer readable storage medium in which computer program code is stored, the computer program code causing an apparatus to perform the following when executed by a processor:
- estimate successive headings of a mobile device based on respective results of measurements by the mobile device on radio signals transmitted by a plurality of transmitters to obtain estimated headings;
- compute a mean heading based on a predetermined number of the estimated headings and compute a standard deviation of the predetermined number of estimated headings, wherein computing the mean heading comprises removing effects of a discontinuity occurring at boundaries of a used angular range of headings, wherein removing effects of a discontinuity occurring at boundaries at least partially comprises changing a scale of negative heading samples or a scale of the mean heading, at least in an instance in which the mean heading is determined to have a predefined relationship to a first threshold or a second threshold;
- determine whether the mean heading is to be considered valid based on the computed standard deviation of the estimated headings; and
- provide an indication of the mean heading as an indication of a current heading of the mobile device for use by an application only if the mean heading is determined to be considered valid.

* * * * *